(12) United States Patent
Kauffmann et al.

(10) Patent No.: US 12,474,356 B2
(45) Date of Patent: Nov. 18, 2025

(54) METHODS OF BLOOD SAMPLE SUSPENSION

(71) Applicant: Siemens Healthcare Diagnostics Inc., Tarrytown, NY (US)

(72) Inventors: Aaron Kauffmann, Elkhart, IN (US); Chris Zimmerle, Goshen, IN (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 1110 days.

(21) Appl. No.: 17/310,233

(22) PCT Filed: Feb. 3, 2020

(86) PCT No.: PCT/US2020/016348
§ 371 (c)(1),
(2) Date: Jul. 27, 2021

(87) PCT Pub. No.: WO2020/163211
PCT Pub. Date: Aug. 13, 2020

(65) Prior Publication Data
US 2022/0163542 A1    May 26, 2022

Related U.S. Application Data

(60) Provisional application No. 62/801,927, filed on Feb. 6, 2019.

(51) Int. Cl.
*G01N 33/72* (2006.01)
*G01N 1/38* (2006.01)
*G01N 21/31* (2006.01)

(52) U.S. Cl.
CPC ............ *G01N 33/723* (2013.01); *G01N 1/38* (2013.01); *G01N 21/31* (2013.01)

(58) Field of Classification Search
CPC ...... G01N 33/49; G01N 33/72; G01N 33/721; G01N 33/723; G01N 1/38; G01N 21/31; G01N 21/314; G01N 21/75; G01N 21/272; A61B 5/14546
USPC ........... 436/63, 66, 67, 164, 174; 422/82.05, 422/82.09
See application file for complete search history.

(56) References Cited

U.S. PATENT DOCUMENTS

| | | | |
|---|---|---|---|
| 4,270,921 A * | 6/1981 | Graas | G01N 33/723 436/67 |
| 5,674,699 A | 10/1997 | Saunders et al. | |
| 6,194,218 B1 | 2/2001 | Rieders et al. | |
| 2003/0068830 A1* | 4/2003 | McCroskey | G01N 33/6842 436/518 |
| 2006/0148096 A1* | 7/2006 | Jina | G01N 33/54388 436/514 |
| 2010/0291691 A1* | 11/2010 | Sugiyama | G01N 30/74 436/67 |
| 2011/0143364 A1* | 6/2011 | Kim | G01N 33/723 435/7.1 |
| 2017/0030932 A1* | 2/2017 | Ledden | B01L 3/502753 |
| 2019/0346364 A1* | 11/2019 | Brunelle | G01N 33/70 |
| 2022/0091139 A1* | 3/2022 | Jones | G01N 21/314 |

FOREIGN PATENT DOCUMENTS

EP    0407860 A2    1/1991
WO    2013059293 A1    4/2013

OTHER PUBLICATIONS

International Search Report and Written Opinion of International Application No. PCT/US2020/016348 dated Jun. 16, 2020.
European Search Report and Search Opinion of European Patent Application No. 20752585.8 dated Feb. 4, 2022.
Wikipedia "Assay"; Dec. 10, 2018, pp. 1-8.
Mallya et al., "Absorption Spectroscopy for the Estimation of Glycated Hemoglobin (HbA1c) for the Diagnostic and Management of Diabetes Mellitus: A Pilot Study", May 1, 2013, Photomedicine and Laser Surgery, vol. 31, No. 5, pp. 219-224.
Siemens DCA® Systems, Product Insert Hemoglobin A1c Reagent Kit, 10734318 Rev A, Jul. 2017, pp. 1-4.

* cited by examiner

*Primary Examiner* — Maureen Wallenhorst (57) ABSTRACT

Disclosed herein are methods for rapid detection of suspension of a blood sample from a subject and methods for improving the processing time of a point of care blood analysis. Specifically, the disclosed methods provide a rapid detection of hemoglobin concentration, more specifically glycated hemoglobin A1c, and determination of sugar concentration in the blood sample from the subject. Further disclosed herein are methods for rapidly diagnosing diabetes in a subject.

17 Claims, 6 Drawing Sheets

Figure 1

FR: Far Red = 710 to 850 nm wavelength. 725 nm was specifically used herein.

Exemplary dataset used for a hemoglobin test

| | B | C | D | E |
|---|---|---|---|---|
| 1 | | Data Stream Source | | |
| 2 | Instrument | Data line from the instrument data stream | Absorbance reading tag | Absorbance reading value |
| 3 | | 15 | G-buf1 | 0.048487633 |
| 4 | | 16 | FR-buf1 | 0.052213006 |
| 5 | | 18 | G-buf2 | 0.0504168 |
| 6 | | 19 | FR-buf2 | 0.053907012 |
| 7 | | 21 | G-buf3 | 0.052543731 |
| 8 | | 22 | FR-buf3 | 0.055540524 |
| 9 | | 24 | G-buf4 | 0.054115538 |
| 10 | | 25 | FR-buf4 | 0.056742482 |
| 11 | | 27 | G-buf5 | 0.05506353 |
| 12 | | 28 | FR-buf5 | 0.05750333 |
| 13 | | 30 | G-buf6 | 0.055730086 |
| 14 | | 31 | FR-buf6 | 0.057999888 |
| 15 | | 33 | G-buf7 | 0.056351184 |
| 16 | | 34 | FR-buf7 | 0.058550188 |
| 17 | | 36 | G-buf8 | 0.056715757 |
| 18 | | 37 | FR-buf8 | 0.058931038 |
| 19 | | 39 | G-buf9 | 0.057084104 |
| 20 | | 40 | FR-buf9 | 0.059140996 |
| 21 | | 42 | G-buf10 | 0.057471106 |
| 22 | | 43 | FR-buf10 | 0.05959808 |
| 23 | | 58 | G-pkup1a | 0.199109788 |
| 24 | | 59 | FR-pkup1a | 0.075320727 |
| 25 | | 61 | G-pkup1b | 0.196003083 |
| 26 | | 62 | FR-pkup1b | 0.073047705 |
| 27 | B40011 | 64 | G-pkup1c | 0.194103767 |
| 28 | | 65 | FR-pkup1c | 0.073233243 |
| 29 | | 67 | G-pkup1d | 0.193491715 |
| 30 | | 68 | FR-pkup1d | 0.073240954 |
| 31 | | 71 | G-pkup1e | 0.193760993 |
| 32 | | 72 | FR-pkup1e | 0.072618857 |
| 33 | | 80 | G-hb1 | 0.190926024 |
| 34 | | 81 | FR-hb1 | 0.070782429 |
| 35 | | 83 | G-hb2 | 0.190988718 |
| 36 | | 84 | FR-hb2 | 0.07081719 |
| 37 | | 86 | G-hb3 | 0.190978605 |
| 38 | | 87 | FR-hb3 | 0.070805433 |
| 39 | | 89 | G-hb4 | 0.19098265 |
| 40 | | 90 | FR-hb4 | 0.070916888 |
| 41 | | 92 | G-hb5 | 0.191028496 |
| 42 | | 93 | FR-hb5 | 0.070896435 |
| 43 | | 95 | G-hb6 | 0.190884233 |
| 44 | | 96 | FR-hb6 | 0.07082946 |
| 45 | | 98 | G-hb7 | 0.190855926 |
| 46 | | 99 | FR-hb7 | 0.070727737 |
| 47 | | 101 | G-hb8 | 0.190810772 |
| 48 | | 102 | FR-hb8 | 0.070666409 |
| 49 | | 104 | G-hb9 | 0.190876819 |
| 50 | | 105 | FR-hb9 | 0.070743071 |
| 51 | | 107 | G-hb10 | 0.190996808 |
| 52 | | 108 | FR-hb10 | 0.070724671 |

FR: Far Red = 710 to 850 nm wavelength. 725 nm was specifically used herein.
G: Green = 495 to 570 nm wavelength. 531 nm was specifically used herein.
Hb = Hemoglobin; Buf = Buffer; Pkup = Peak up read

| | G | H | I | J | K | L | M | N | O |
|---|---|---|---|---|---|---|---|---|---|
| 2 | Value tags pulled from column E for TRUE/FALSE criteria | Absorbance values from column F for TRUE/FALSE criteria | TRUE/FALSE criteria 1 (Is absorbance high enough above signal noise) | TRUE/FALS E criteria 2 (Is lysis complete) | TRUE/FALSE criteria 3 (Has hemoglobin stopped coming out of the capillary) | Are criteria 1-3 TRUE or is only criteria 1 TRUE for the "Hb Read" | What time was the first passing criteria met? | What was the Hb absorbance at the first passing criteria? | What is the [Hb] to be used when calculating %HbA1c? |
| 3 | Gr Buffer | 0.0543 | | | | | | | |
| 4 | Fr Buffer | 0.0570 | | | | | | | |
| 5 | PkUp 1a | 0.1264 | TRUE | N/A | N/A | N/A | N/A | N/A | N/A |
| 6 | PkUp 1b | 0.1255 | TRUE | FALSE | TRUE | FALSE | 0 | 0 | 0 |
| 7 | PkUp 1c | 0.1234 | TRUE | TRUE | FALSE | FALSE | 0 | 0 | 0 |
| 8 | PkUp 1d | 0.1228 | TRUE | TRUE | TRUE | TRUE | 4 | 0.1228 | 15.018 |
| 9 | PkUp 1e | 0.1237 | TRUE | FALSE | FALSE | TRUE | 0 | 0 | 0 |
| 10 | Hb Read | 0.1227 | TRUE | | | | | | |
| 11 | Example of the coding by column using "PkUp 1e" | 531nm – 725nm absorbance =(E31-H3)-(E32-H4) | =IF(H9>0.0586, TRUE,FALSE) | =AND(((E32-E30)>-0.0009355), ((E32-E30)<0.0006745)) | =AND(((E31-E29)-(E32-E30))<(-0.0006418 +0.000618), ((E31-E29)-(E32-E30))>(-0.0006418 - 0.000618)) | =IF(AND (K9,J9,I9), TRUE, FALSE) | =IF(AND (L9=TRUE, L8=FALSE, L7=FALSE, L6=FALSE), 4.25,0) | =IF(AND (L9=TRUE, L8=FALSE, L7=FALSE, L6=FALSE), H9,0) | = 111.29 * SUM(N5:N10) + 1.3439 |

Figure 5

METHODS OF BLOOD SAMPLE SUSPENSION

CROSS-REFERENCE TO RELATED APPLICATIONS

This application claims priority to U.S. provisional application No. 62/801,927, filed Feb. 6, 2019, the disclosure of which is incorporated herein by reference in its entirety.

TECHNICAL FIELD

Disclosed herein are methods for detection of suspension of a blood sample from a subject. Specifically, the disclosed methods provide a detection of hemoglobin concentration, more specifically glycated hemoglobin A1c, and determination of sugar concentration in the blood sample from the subject.

BACKGROUND

Hemoglobin present in red blood cells can be glycated by the non-enzymatic addition of a glucose molecule to the amino terminus of the β-chain of the hemoglobin. Once a hemoglobin molecule is glycated, it remains glycated, and an accumulation of glycated hemoglobin within a red cell reflects the average level of glucose to which the cell has been exposed during its life cycle. The level of glycated hemoglobin present in an individual's blood is thus proportional to the level of glucose in the blood and is an indicator of the individual's mean daily blood glucose concentration over the previous four weeks to three months.

Specifically, hemoglobin A1c (HbA1c) reflects the mean blood glucose concentration and is used as a risk parameter for diabetic complications and as a quality assurance indicator for the quality of diabetes care. Point-of-care (POC) instruments for HbA1c are widely used for the measurement of HbA1c. These instruments assist health care providers with decision-making for diagnosing, treating, and managing patient care and the swiftness for obtaining results minimize the delay associated with conventional laboratory measures and reduce the need for additional office visits to implement clinical decisions.

In general, a blood sample is mixed for several rounds before getting pulled out of the instrument's capillary. Typically, this process is relatively fast (less than 10 minutes) but under high hematocrit and long incubation times in the capillary, considerable mixing time is required. The current POC instruments mix more than necessary for most samples to compensate for the cases where a high amount of mixing is required. Rapid results can increase clinical effectiveness and contribute to improved outcomes for patients, but it is imperative that the results provided by the device are accurate and reliable as faster results are only safe if they are accurate.

There is a need in the art for improved POC instruments for blood sample analysis that provide quick and reliable results which would benefit both the patients and health care providers. This invention addresses this need.

SUMMARY

Disclosed herein are methods for detecting and analyzing a blood sample.

In one aspect, provided herein are methods for performing a blood sugar assay. The methods comprise:

(a) generating a hemolysate mixture by mixing a blood sample from a subject with a buffer;
(b) measuring the absorbance value of the buffer at a wavelength x (buffer$_x$) and the absorbance value of the buffer at a wavelength y (buffer$_y$);
(c) measuring the absorbance value of the hemolysate mixture at a timepoint n at a wavelength x (hemo$_{xn}$) and at a wavelength y (hemo$_{yn}$);
(d) determining the differential (dhemo$_{xn}$) between hemo$_{xn}$ and buffer$_x$;
(e) determining the differential (dhemo$_{yn}$) between hemo$_y$n and buffer$_y$;
(f) determining the absolute value ($V_n$) of the differential between dhemo$_{xn}$ and dhemo$_{yn}$;
(g) repeating steps (c) to (e) for one additional consecutive timepoint n+1, wherein the timepoint n of step (c) becomes equal to n+1, to generate dhemo$_{xn+1}$ and dhemo$_{yn+1}$.
(h) determining the differential between dhemo$_{yn}$ and dhemo$_{yn+1}$, wherein yn and yn+1 relate to two consecutive measurements;
(i) determining the absolute value ($V_N$) of the differential between dhemo$_{yn}$ and dhemo$_{yn+1}$;
(j) determining the absolute value ($V_{n+1}$) of the differential between dhemo$_{xn+1}$ and dhemo$_{yn+1}$
(k) assessing the absolute values $V_n$, ($V_{n+1}$)-($V_n$), and $V_N$, wherein,
  i. if step (k) is performed at less than a time t from the start of the mixing in step (a) and
    a. the absolute value $V_n$ is indicative of a glycated hemoglobin concentration of at least about 5 g/dL, the absolute value ($V_{n+1}$)-($V_n$) is about zero, and the absolute value $V_N$ is about zero, the blood sample is sufficiently mixed with the buffer for further analysis; or
    b. the absolute value of $V_n$ is not indicative of a glycated hemoglobin concentration of at least about 5 g/dL, the absolute value of ($V_n$+1)-($V_n$) is not about zero, or the absolute value of $V_N$ is not about zero, the hemolysate is mixed further and steps (g) to (j) are repeated;
  ii. if step (k) is performed at time t from the start of the mixing and
    a. the absolute value $V_n$ is indicative of a glycated hemoglobin concentration of at least about 5 g/dL, the blood sample is sufficiently mixed with the buffer for further analysis; or
    b. the absolute value $V_n$ is not indicative of a glycated hemoglobin concentration of at least about 5 g/dL, the blood sample is not sufficiently mixed with the buffer for further analysis;
(l) analyzing the sufficiently mixed blood sample to detect the glycated hemoglobin concentration;
(m) assessing the level of sugar in the blood sample based upon the glycated hemoglobin concentration so detected; and,
(n) providing an output result for the blood sugar assay, the output comprising the glycated hemoglobin concentration and the level of sugar in the blood sample.

In some embodiments, the methods comprise analyzing the sufficiently mixed blood sample to detect the glycated hemoglobin concentration; assessing the level of sugar in the blood sample based upon the glycated hemoglobin concentration so detected; and, providing an output result for the blood sugar assay, the output comprising the glycated hemoglobin concentration and the level of sugar in the blood sample.

Methods for diagnosing diabetes in a subject also are provided. The methods comprise:
- (a) generating a hemolysate mixture by mixing a blood sample from a subject with a buffer;
- (b) measuring the absorbance value of the buffer at a wavelength x ($buffer_x$) and the absorbance value of the buffer at a wavelength y ($buffer_y$);
- (c) measuring the absorbance value of the hemolysate mixture at a timepoint n at a wavelength x ($hemo_{xn}$) and at a wavelength y ($hemo_{yn}$);
- (d) determining the differential ($dhemo_{xn}$) between $hemo_{xn}$ and $buffer_x$;
- (e) determining the differential ($dhemo_{yn}$) between $hemo_yn$ and $buffer_y$;
- (f) determining the absolute value ($V_n$) of the differential between $dhemo_{xn}$ and $dhemo_{yn}$;
- (g) repeating steps (c) to (e) for one additional consecutive timepoint n+1, wherein the timepoint n of step (c) becomes equal to n+1, to generate $dhemo_{xn+1}$ and $dhemo_{yn+1}$;
- (h) determining the differential between $dhemo_{yn}$ and $dhemo_{yn+1}$, wherein yn and yn+1 relate to two consecutive measurements;
- (i) determining the absolute value ($V_N$) of the differential between $dhemo_{yn}$ and $dhemo_{yn+1}$;
- (j) determining the absolute value ($V_{n+1}$) of the differential between $dhemo_{xn+1}$ and $dhemo_{yn+1}$
- (k) assessing the absolute values $V_n$, $(V_{n+1})-(V_n)$, and $V_N$, wherein,
    - i. if step (k) is performed at less than a time t from the start of the mixing in step (a) and
        - a. the absolute value $V_n$ is indicative of a glycated hemoglobin concentration of at least about 5 g/dL, the absolute value $(V_{n+1})-(V_n)$ is about zero, and the absolute value $V_N$ is about zero, the blood sample is sufficiently mixed with the buffer for further analysis; or
        - b. the absolute value of $V_n$ is not indicative of a glycated hemoglobin concentration of at least about 5 g/dL, the absolute value of $(V_{n+1})-(V_n)$ is not about zero, or the absolute value of $V_N$ is not about zero, the hemolysate is mixed further and steps (g) to (j) are repeated;
    - ii. if step (k) is performed at time t from the start of the mixing and
        - a. the absolute value $V_n$ is indicative of a glycated hemoglobin concentration of at least about 5 g/dL, the blood sample is sufficiently mixed with the buffer for further analysis; or
        - b. the absolute value $V_n$ is not indicative of a glycated hemoglobin concentration of at least about 5 g/dL, the blood sample is not sufficiently mixed with the buffer for further analysis.

In some embodiments of the disclosed methods for diagnosing diabetes in a subject, the further analysis of the blood sample comprises the additional steps of: (l) analyzing the sufficiently mixed blood sample to detect the glycated hemoglobin concentration; (m) determining the glucose concentration in the blood sample from the subject based upon the glycated hemoglobin concentration so detected; (n) providing an output result comprising the glycated hemoglobin concentration and the glucose concentration in the blood sample from the subject; (o) diagnosing the subject with diabetes when the glucose concentration in the blood sample is above a reference concentration; and, (p) when diagnosed with diabetes, recommending a treatment of the subject, wherein the treatment comprises diet, exercise and/or medication. In some embodiments, the steps (a) to (o) of blood sample processing and the diagnosing of the subject are performed in less than 5 minutes. In other embodiments, the steps (a) to (o) of blood sample processing and the diagnosing of the subject are performed in about 3.5 minutes. Also provided herein are methods for improving the processing time of a point of care blood analysis. The methods comprise:
- (a) generating a hemolysate mixture by mixing a blood sample from a subject with a buffer;
- (b) measuring the absorbance value of the buffer at a wavelength x ($buffer_x$) and the absorbance value of the buffer at a wavelength y ($buffer_y$);
- (c) measuring the absorbance value of the hemolysate mixture at a timepoint n at a wavelength x ($hemo_{xn}$) and at a wavelength y ($hemo_{yn}$);
- (d) determining the differential ($dhemo_{xn}$) between $hemo_{xn}$ and $buffer_x$;
- (e) determining the differential ($dhemo_{yn}$) between $hemo_yn$ and $buffer_y$;
- (f) determining the absolute value ($V_n$) of the differential between $dhemo_{xn}$ and $dhemo_{yn}$;
- (g) repeating steps (c) to (e) for one additional consecutive timepoint n+1, wherein the timepoint n of step (c) becomes equal to n+1, to generate $dhemo_{xn+1}$ and $dhemo_{yn+1}$;
- (h) determining the differential between $dhemo_{yn}$ and $dhemo_{yn+1}$, wherein yn and yn+1 relate to two consecutive measurements;
- (i) determining the absolute value ($V_N$) of the differential between $dhemo_{yn}$ and $dhemo_{yn+1}$;
- (j) determining the absolute value ($V_{n+1}$) of the differential between $dhemo_{xn+1}$ and $dhemo_{yn+1}$
- (k) assessing the absolute values $V_n$, $(V_{n+1})-(V_n)$, and $V_N$, wherein,
    - i. if step (k) is performed at less than a time t from the start of the mixing in step (a) and
        - a. the absolute value $V_n$ is indicative of a glycated hemoglobin concentration of at least about 5 g/dL, the absolute value $(V_{n+1})-(V_n)$ is about zero, and the absolute value $V_N$ is about zero, the blood sample is sufficiently mixed with the buffer for further analysis; or
        - b. the absolute value of $V_n$ is not indicative of a glycated hemoglobin concentration of at least about 5 g/dL, the absolute value of $(V_{n+1})-(V_n)$ is not about zero, or the absolute value of $V_N$ is not about zero, the hemolysate is mixed further and steps (g) to (j) are repeated;
    - ii. if step (k) is performed at time t from the start of the mixing and
        - a. the absolute value $V_n$ is indicative of a glycated hemoglobin concentration of at least about 5 g/dL, the blood sample is sufficiently mixed with the buffer for further analysis; or
        - b. the absolute value $V_n$ is not indicative of a glycated hemoglobin concentration of at least about 5 g/dL, the blood sample is not sufficiently mixed with the buffer for further analysis;
- (l) analyzing the sufficiently mixed blood sample to detect the hemoglobin concentration; and,
- (m) providing in less than 5 min an output result comprising the hemoglobin concentration thereby improving the point of care blood analysis as compared to a standard point of care blood analysis.

In some embodiments of the various disclosed methods, the step of mixing to generate the hemolysate mixture comprises sonicating the blood sample and/or treating the blood sample with a lysis buffer. In some embodiments, the buffer comprises lithium thiocyanate, digitonin and/or potassium ferricyanide. In some embodiments, the buffer may comprise an anticoagulant selected from the group consisting of EDTA, heparin, citrate and fluoride/oxalate.

In some embodiments, the blood sample may be in a vessel such as, but not limited to, a capillary tube, a capillary plate or a capillary membrane.

In some embodiments, the wavelength x is within the range of at least one set of wavelengths selected from the group consisting of: (a) 380 nm to 455 nm; (b) 455 nm to 580 nm; and (c) 580 nm to 680 nm.

In some embodiments, the wavelength y is within the range of 700 nm to 2500 nm. In yet other embodiments, the wavelengths x and y correspond respectively to 531 nm and 725 nm.

In some embodiments of the disclosed methods, step (c) is performed at least 2 seconds after step (b).

In some embodiments, if the blood sample is indicated to be not sufficiently mixed in step (k)(ii)(b), the blood sample is replaced by another blood sample.

In some embodiments, the time t is about 60 seconds, about 70 seconds, about 80 seconds, about 90 seconds, about 100 seconds, about 110 seconds or about 120 seconds.

According to some embodiments, the hemolysate is at least partially suspended.

In some embodiments, the blood sample is a human blood sample.

In further embodiments, the absolute value of (i) is about the absolute value of (0+/−0.002) or (−0.0002619+/−0.001349). In yet further embodiments, the absolute value of $(V_n+1)-(V_n)$ is about the absolute value of (0+/−0.002) or (−0.0006418+/−0.001758).

According to some embodiments, the hemoglobin or glycated hemoglobin concentration is at least about one selected from the group consisting of: 5 g/dL and 7 g/dL.

In some embodiments, the glycated hemoglobin is hemoglobin A1c (HbA1c).

BRIEF DESCRIPTION OF THE DRAWINGS

FIGS. 4A-4B are series of tables demonstrating how the data is processed with the presently disclosed methods. FIG. 4A is a table listing an exemplary dataset for given blood sample.

DETAILED DESCRIPTION OF ILLUSTRATIVE EMBODIMENTS

The disclosed methods may be understood more readily by reference to the following detailed description taken in connection with the accompanying figures, which form a part of this disclosure. It is to be understood that the disclosed methods are not limited to the specific methods described and/or shown herein, and that the terminology used herein is for the purpose of describing particular embodiments by way of example only and is not intended to be limiting of the claimed methods.

It is to be appreciated that certain features of the disclosed methods which are, for clarity, described herein in the context of separate embodiments, may also be provided in combination in a single embodiment. Conversely, various features of the disclosed methods that are, for brevity, described in the context of a single embodiment, may also be provided separately or in any subcombination.

Definitions

Unless defined otherwise, all technical and scientific terms used herein have the same meaning as commonly understood by one of ordinary skill in the art to which the invention pertains. Although any methods and materials similar or equivalent to those described herein may be used in the practice for testing of the present invention, the preferred materials and methods are described herein. In describing and claiming the present invention, the following terminology will be used.

It is also to be understood that the terminology used herein is for the purpose of describing particular embodiments only and is not intended to be limiting.

As used herein, the singular forms "a," "an," and "the" include the plural referents unless context clearly indicates otherwise. Similarly, the word "or" is intended to include "and" unless the context clearly indicates otherwise.

As used herein, the term "about" will be understood by persons of ordinary skill in the art and will vary to some extent on the context in which it is used. As used herein when referring to a measurable value such as an amount, a concentration, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the terms "comprising," "including," "containing" and "characterized by" are exchangeable, inclusive, open-ended and do not exclude additional, unrecited elements or method steps. Any recitation herein of the term "comprising," particularly in a description of components of a composition or in a description of elements of a device, is understood to encompass those compositions and methods consisting essentially of and consisting of the recited components or elements.

As used herein, the term "consisting of" excludes any element, step, or ingredient not specified in the claim element.

By "disease" is meant any condition or disorder that damages or interferes with the normal function of a cell, tissue, or organ.

An "individual", "patient" or "subject", as these terms are used interchangeably herein, includes a member of any animal species including, but are not limited to, birds, humans and other primates, and other mammals including commercially relevant mammals such as cattle, pigs, horses, sheep, cats, and dogs. Preferably, the subject is a human.

As used herein, the terms "treatment" and "treating" refer to an approach for obtaining beneficial or desired results including, but not limited to, therapeutic benefit and/or a prophylactic benefit.

For example, the term treatment includes the administration of an agent prior to or following the onset of a disease or disorder thereby preventing or removing all signs of the disease or disorder. As another example, administration of the agent after clinical manifestation of the disease to combat the symptoms of the disease comprises "treatment" of the disease. This includes prevention of a disease such as diabetes.

By therapeutic benefit is meant eradication or amelioration of the underlying disorder being treated or amelioration of one or more of the physiological symptoms associated with the underlying disorder such that an improvement is observed in the patient, notwithstanding that the patient may still be afflicted with the underlying disorder. For prophylactic benefit, the compositions may be administered to a patient at risk of developing a particular disease, or to a patient reporting one or more of the physiological symptoms of a disease, even though a diagnosis of this disease may not have been made.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Various terms relating to aspects of the description are used throughout the specification and claims. Such terms are to be given their ordinary meaning in the art unless otherwise indicated. Other specifically defined terms are to be construed in a manner consistent with the definitions provided herein.

Methods

Provided herein are methods for performing a blood sugar assay, for detecting suspension of a blood sample, and methods for improving the processing time of a point of care blood analysis. The methods comprise the following steps:

(a) generating a hemolysate mixture by mixing a blood sample from a subject with a buffer;

(b) measuring the absorbance value of the buffer at a wavelength x ($buffer_x$) and the absorbance value of the buffer at a wavelength y ($buffer_y$);

(c) measuring the absorbance value of the hemolysate mixture at a timepoint n at a wavelength x ($hemo_{xn}$) and at a wavelength y ($hemo_{yn}$);

(d) determining the differential ($dhemo_{xn}$) between $hemo_{xn}$ and $buffer_x$;

(e) determining the differential ($dhemo_{yn}$) between $hemo_yn$ and $buffer_y$;

(f) determining the absolute value ($V_n$) of the differential between $dhemo_{xn}$ and $dhemo_{yn}$;

(g) repeating steps (c) to (e) for one additional consecutive timepoint n+1, wherein the timepoint n of step (c) becomes equal to n+1, to generate $dhemo_{xn+1}$ and $dhemo_{yn+1}$.

(h) determining the differential between $dhemo_{yn}$ and $dhemo_{yn+1}$, wherein yn and yn+1 relate to two consecutive measurements;

(i) determining the absolute value ($V_N$) of the differential between $dhemo_{yn}$ and $dhemo_{yn+1}$;

(j) determining the absolute value ($V_{n+1}$) of the differential between $dhemo_{xn+1}$ and $dhemo_{yn+1}$ (k) assessing the absolute values $V_n$, ($V_{n+1}$)-($V_n$), and $V_N$, wherein, i. if step (k) is performed at less than a time t from the start of the mixing in step (a) and
   a. the absolute value $V_n$ is indicative of a glycated hemoglobin concentration of at least about 5 g/dL, the absolute value ($V_{n+1}$)-($V_n$) is about zero, and the absolute value $V_N$ is about zero, the blood sample is sufficiently mixed with the buffer for further analysis; or
   b. the absolute value of $V_n$ is not indicative of a glycated hemoglobin concentration of at least about 5 g/dL, the absolute value of ($V_{n+1}$)-($V_n$) is not about zero, or the absolute value of $V_N$ is not about zero, the hemolysate is mixed further and steps (g) to (j) are repeated;

ii. if step (k) is performed at time t from the start of the mixing and
   a. the absolute value $V_n$ is indicative of a glycated hemoglobin concentration of at least about 5 g/dL, the blood sample is sufficiently mixed with the buffer for further analysis; or
   b. the absolute value $V_n$ is not indicative of a glycated hemoglobin concentration of at least about 5 g/dL, the blood sample is not sufficiently mixed with the buffer for further analysis;

(l) analyzing the sufficiently mixed blood sample to detect the glycated hemoglobin concentration;

(m) assessing the level of sugar in the blood sample based upon the glycated hemoglobin concentration so detected; and, (n) providing an output result for the blood sugar assay, the output comprising the glycated hemoglobin concentration and the level of sugar in the blood sample.

In some embodiments, each blood pickup read is compared to the prior blood pickup read. For instance, $dhemo_{yn}$ from a given timepoint t1 is compared to $dhemo_{yn+1}$ from a consecutive timepoint t2.

In some embodiments, the methods comprise analyzing the sufficiently mixed blood sample to detect the glycated hemoglobin concentration; assessing the level of sugar in the blood sample based upon the glycated hemoglobin concentration so detected and, providing an output result for the blood sugar assay, the output comprising the glycated hemoglobin concentration and the level of sugar in the blood sample.

In the disclosed methods for improving the processing time of a point of care blood analysis, these methods comprise analyzing the sufficiently mixed blood sample to detect the hemoglobin concentration; and, providing in less than 5 min an output result comprising the hemoglobin concentration thereby improving the point of care blood analysis as compared to a standard point of care blood analysis.

In some embodiments, step (c) is performed at least 2 seconds after step (b).

If the blood sample is indicated to be not sufficiently mixed in step (k)(ii)(b), the blood sample may be replaced by another blood sample.

In some embodiments, the steps (c) to (e) are repeated about 60, about 50, about 40, about 30, about 20, about 10, about 5 times or less. In some embodiments, the timepoints n range from n equals 1 to 29.

In some embodiments, the time t is about 30 seconds, about 40 seconds, about 50 seconds, about 60 seconds, about 70 seconds, about 80 seconds, about 90 seconds, about 100 seconds, about 110 seconds, about 120 seconds, about 130 seconds, about 140 seconds, about 150 seconds, about 160 seconds, about 170 seconds, about 180 seconds, about 190 seconds, about 200 seconds or more. In some embodiments, the time t is about 60 seconds, about 70 seconds, about 80 seconds, about 90 seconds, about 100 seconds, about 110 seconds or about 120 seconds.

In some embodiments, the absolute value of step (i) and/or $(V_n+1)-(V_n)$ is any absolute value that ranges: between 0 and 0.006; between 0 and 0.0055; between 0 and 0.005; between 0 and 0.0045; between 0 and 0.004; between 0 and 0.0035; between 0 and 0.003; between 0 and 0.0025; between 0 and 0.002; between 0 and 0.0015; between 0 and 0.001; between 0 and 0.0005; or between 0 and 0.0001. For example, the absolute value in step (i) may be about the absolute value of (0+/−0.002) or (−0.0002619+/−0.001349) and/or the absolute value in step (j) may be about the absolute value of (0+/−0.002) or (−0.0006418+/−0.001758).

In some embodiments, the analysis is performed in less than 5 minutes.

Further provided herein are methods for detection of a glycated hemoglobin in a blood sample and methods for performing a blood sugar assay. These methods comprise similar steps as the methods and embodiments listed herein above. Specifically, such methods comprise the following steps:

(a) generating a hemolysate mixture by mixing a blood sample from a subject with a buffer;
(b) measuring the absorbance value of the buffer at a wavelength x ($buffer_x$) and the absorbance value of the buffer at a wavelength y ($buffer_y$);
(c) measuring the absorbance value of the hemolysate mixture at a timepoint n at a wavelength x ($hemo_{xn}$) and at a wavelength y ($hemo_{yn}$);
(d) determining the differential ($dhemo_{xn}$) between $hemo_{xn}$ and $buffer_x$;
(e) determining the differential ($dhemo_{yn}$) between $hemo_{yn}$ and $buffer_y$;
(f) determining the absolute value ($V_n$) of the differential between $dhemo_{xn}$ and $dhemo_{yn}$;
(g) repeating steps (c) to (e) for one additional consecutive timepoint n+1, wherein the timepoint n of step (c) becomes equal to n+1, to generate $dhemo_{xn+1}$ and $dhemo_{yn+1}$.
(h) determining the differential between $dhemo_{yn}$ and $dhemo_{yn}+1$, wherein yn and yn+1 relate to two consecutive measurements;
(i) determining the absolute value ($V_N$) of the differential between $dhemo_{yn}$ and $dhemo_{yn+1}$;
(j) determining the absolute value ($V_{n+1}$) of the differential between $dhemo_{xn+1}$ and $dhemo_{yn+1}$
(k) assessing the absolute values $V_n$, $(V_{n+1})-(V_n)$, and $V_N$, wherein,
  i. if step (k) is performed at less than a time t from the start of the mixing in step (a) and
    a. the absolute value $V_n$ is indicative of a glycated hemoglobin concentration of at least about 5 g/dL, the absolute value $(V_{n+1})-(V_n)$ is about zero, and the absolute value $V_N$ is about zero, the blood sample is sufficiently mixed with the buffer for further analysis; or
    b. the absolute value of $V_n$ is not indicative of a glycated hemoglobin concentration of at least about 5 g/dL, the absolute value of $(V_n+1)-(V_n)$ is not about zero, or the absolute value of $V_N$ is not about zero, the hemolysate is mixed further and steps (g) to (j) are repeated;
  ii. if step (k) is performed at time t from the start of the mixing and
    a. the absolute value $V_n$ is indicative of a glycated hemoglobin concentration of at least about 5 g/dL, the blood sample is sufficiently mixed with the buffer for further analysis; orb. the absolute value $V_n$ is not indicative of a glycated hemoglobin concentration of at least about 5 g/dL, the blood sample is not sufficiently mixed with the buffer for further analysis.

In addition to steps (a) through (k), the disclosed methods for performing a blood sugar assay comprise analyzing the sufficiently mixed blood sample to detect the glycated hemoglobin concentration; assessing the level of sugar in the blood sample based upon the glycated hemoglobin concentration so detected; and, providing an output result for the blood sugar assay, the output comprising the glycated hemoglobin concentration and the level of sugar in the blood sample.

In some embodiments, step (c) is performed at least 2 seconds after step (b).

If the blood sample is indicated to be not sufficiently mixed in step (k)(ii)(b), the blood sample may be replaced by another blood sample.

In some embodiments, the steps (c) to (e) are repeated about 60, about 50, about 40, about 30, about 20, about 10, about 5 times or less. In some embodiments, the timepoints n range from n equals 1 to 29.

In some embodiments, the time t is about 30 seconds, about 40 seconds, about 50 seconds, about 60 seconds, about 70 seconds, about 80 seconds, about 90 seconds, about 100 seconds, about 110 seconds, about 120 seconds, about 130 seconds, about 140 seconds, about 150 seconds, about 160 seconds, about 170 seconds, about 180 seconds, about 190 seconds, about 200 seconds or more. In some embodiments, the time t is about 60 seconds, about 70 seconds, about 80 seconds, about 90 seconds, about 100 seconds, about 110 seconds or about 120 seconds.

In some embodiments, the absolute value of step (i) and/or $(V_n+1)-(V_n)$ is any absolute value that ranges: between 0 and 0.006; between 0 and 0.0055; between 0 and 0.005; between 0 and 0.0045; between 0 and 0.004; between 0 and 0.0035; between 0 and 0.003; between 0 and 0.0025; between 0 and 0.002; between 0 and 0.0015; between 0 and 0.001; between 0 and 0.0005; or between 0 and 0.0001. For example, the absolute value in step (i) may be about the absolute value of (0+/−0.002) or (−0.0002619+/−0.001349) and/or the absolute value in $(V_n+1)-(V_n)$ may be about the absolute value of (0+/−0.002) or (−0.0006418+/−0.001758).

Further provided herein are methods for diagnosing diabetes in a subject. Such methods comprise similar steps and embodiments as the methods described above herein. Specifically, such methods comprise the following steps:
- (a) generating a hemolysate mixture by mixing a blood sample from a subject with a buffer;
- (b) measuring the absorbance value of the buffer at a wavelength x (buffer$_x$) and the absorbance value of the buffer at a wavelength y (buffer$_y$);
- (c) measuring the absorbance value of the hemolysate mixture at a timepoint n at a wavelength x (hemo$_{xn}$) and at a wavelength y (hemo$_{yn}$);
- (d) determining the differential (dhemo$_{xn}$) between hemo$_{xn}$ and buffer$_x$;
- (e) determining the differential (dhemo$_{yn}$) between hemo$_y$n and buffer$_y$;
- (f) determining the absolute value ($V_n$) of the differential between dhemo$_{xn}$ and dhemo$_{yn}$;
- (g) repeating steps (c) to (e) for one additional consecutive timepoint n+1, wherein the timepoint n of step (c) becomes equal to n+1, to generate dhemo$_{xn+1}$ and dhemo$_{yn+1}$;
- (h) determining the differential between dhemo$_{yn}$ and dhemo$_{yn}$+1, wherein yn and yn+1 relate to two consecutive measurements;
- (i) determining the absolute value ($V_N$) of the differential between dhemo$_{yn}$ and dhemo$_{yn+1}$;
- (j) determining the absolute value ($V_{n+1}$) of the differential between dhemo$_{xn+1}$ and dhemo$_{yn+1}$
- (k) assessing the absolute values $V_n$, ($V_{n+1}$)-($V_n$), and $V_N$, wherein,
    - i. if step (k) is performed at less than a time t from the start of the mixing in step (a) and
        - a. the absolute value $V_n$ is indicative of a glycated hemoglobin concentration of at least about 5 g/dL, the absolute value ($V_{n+1}$)-($V_n$) is about zero, and the absolute value $V_N$ is about zero, the blood sample is sufficiently mixed with the buffer for further analysis; or
        - b. the absolute value of $V_n$ is not indicative of a glycated hemoglobin concentration of at least about 5 g/dL, the absolute value of ($V_{n+1}$)-($V_n$) is not about zero, or the absolute value of $V_N$ is not about zero, the hemolysate is mixed further and steps (g) to (j) are repeated;
    - ii. if step (k) is performed at time t from the start of the mixing and
        - a. the absolute value $V_n$ is indicative of a glycated hemoglobin concentration of at least about 5 g/dL, the blood sample is sufficiently mixed with the buffer for further analysis; or
        - b. the absolute value $V_n$ is not indicative of a glycated hemoglobin concentration of at least about 5 g/dL, the blood sample is not sufficiently mixed with the buffer for further analysis.

In some embodiments, step (c) is performed at least 2 seconds after step (b).

If the blood sample is indicated to be not sufficiently mixed in step (k)(ii)(b), the blood sample may be replaced by another blood sample.

In some embodiments, the step (g) is repeated about 60, about 50, about 40, about 30, about 20, about 10, about 5 times or less. In some embodiments, the timepoints n range from n equals 1 to 29.

In some embodiments, the time t is about 30 seconds, about 40 seconds, about 50 seconds, about 60 seconds, about 70 seconds, about 80 seconds, about 90 seconds, about 100 seconds, about 110 seconds, about 120 seconds, about 130 seconds, about 140 seconds, about 150 seconds, about 160 seconds, about 170 seconds, about 180 seconds, about 190 seconds, about 200 seconds or more. In some embodiments, the time t is about 60 seconds, about 70 seconds, about 80 seconds, about 90 seconds, about 100 seconds, about 110 seconds or about 120 seconds.

In some embodiments, the absolute value of step (i) and/or ($V_{n+1}$)-($V_n$) is any absolute value that ranges: between 0 and 0.006; between 0 and 0.0055; between 0 and 0.005; between 0 and 0.0045; between 0 and 0.004; between 0 and 0.0035; between 0 and 0.003; between 0 and 0.0025; between 0 and 0.002; between 0 and 0.0015; between 0 and 0.001; between 0 and 0.0005; or between 0 and 0.0001. For example, the absolute value in step (i) may be about the absolute value of (0+/−0.002) or (−0.0002619+/−0.001349) and/or the absolute value in ($V_{n+1}$)-($V_n$) may be about the absolute value of (0+/−0.002) or (−0.0006418+/−0.001758).

Additionally, in some embodiments of the disclosed methods for diagnosing diabetes in a subject, the further analysis of the blood sample comprises: analyzing the sufficiently mixed blood sample to detect the glycated hemoglobin concentration; determining the glucose concentration in the blood sample from the subject based upon the glycated hemoglobin concentration so detected; diagnosing the subject with diabetes when the glucose concentration in the blood sample is above a reference concentration; and when diagnosed with diabetes, recommending a treatment of the subject, wherein the treatment comprises diet, exercise and/or medication. In some embodiments, the steps (a) to (o) of the blood sample processing and the diagnosing of the subject are performed in less than 5 minutes. In other embodiments, the steps (a) to (o) of the blood sample processing and the diagnosing of the subject are performed in about 3.5 minutes. In some embodiments, by following the methods provided herein, the time necessary for processing the blood sample, determining the glucose concentration in the blood sample and diagnosing the subject is shortened as compared to other methods currently known and used by a skilled artisan, such as but not limited to the In2It™ analyzer (Bio-Rad) or the DCA Vantage® analyzer (Siemens Healthineers). Methods known in the art for measuring blood sugar (glucose) concentration also include methods based on an immunoassay, high performance liquid chromatography (HPLC) and borate affinity chromatography.

It is known in the art that when blood sugar concentration rises, a glucose moiety conjugates with hemoglobin. This hemoglobin-glucose conjugate is referred to as glycated hemoglobin. There are three different forms of glycated hemoglobin: HbA1a, HbA1b and HbA1c. HbA1c is the most common form and is the one mainly used in blood assays. For a given subject, the glycated hemoglobin value is in equilibrium with a value of blood sugar over the past two to three months. HbA1c provides valuable information for evaluating average blood glucose levels over a period of two to three months and has particular clinical utility because its value is minimally affected by short, large fluctuations in blood glucose concentration. The glycated hemoglobin value is checked and used as an index for glycemia and/or glycosuria management.

The glycated hemoglobin has a structure in which the glucose is conjugated to the N-terminal valine in the β-chain hemoglobin in the blood, and only a glucose moiety must be specifically detected and measured to distinguish it from the hemoglobin. To quantitatively measure the glycated hemoglobin value, a fraction of an amount of glycated hemoglobin on the basis of an amount of total hemoglobin is given. In some embodiments, the hemoglobin comprises hemoglobin A, hemoglobin A1c, hemoglobin C, hemoglobin E, hemoglobin D, hemoglobin F, and hemoglobin S, or any combination thereof. In other embodiments, the hemoglobin is a glycated hemoglobin. In further embodiments, the glycated hemoglobin is hemoglobin A1c (HbA1c).

The amount of total hemoglobin generally has a range of 13 to 17 g/dL for adult men, a range of 12 to 15 g/dL for adult women, and a range of 11 to 14 g/dL for infants. When the glycated hemoglobin value is 6.0%, it may be expressed as about 12 g/dL on average for a two to three-month blood sugar. The American Diabetes Association (ADA) recommends that the glycated hemoglobin value be maintained to 6.5% or less, and a normal range thereof is 4.0 to 5.7%. In some embodiments, the hemoglobin or glycated hemoglobin concentration is about at least 7 g/dL. In other embodiments, the hemoglobin concentration ranges from about 7 g/dL to about 21 g/dL. In yet other embodiments, the absolute value of step (f), as described in the methods above herein, indicates a hemoglobin or glycated hemoglobin concentration, at +/−0.1 g/dL, of at least one selected from the group consisting of: 1 g/dL; 1.5 g/dL; 2 g/dL; 2.5 g/dL; 3 g/dL; 3.5 g/dL; 4 g/dL; 4.5 g/dL; 5 g/dL; 5.5 g/dL; 6 g/dL; 6.5 g/dL; 7 g/dL; 7.5 g/dL; 8 g/dL; 8.5 g/dL; 9 g/dL; 9.5 g/dL; 10 g/dL; 10.5 g/dL; 11 g/dL; 11.5 g/dL; 12 g/dL; 12.5 g/dL; 13 g/dL; 13.5 g/dL; 14 g/dL; 14.5 g/dL; 15 g/dL; 15.5 g/dL; 16 g/dL; 16.5 g/dL; 17 g/dL; 17.5 g/dL; 18 g/dL; 18.5 g/dL; 19 g/dL; 19.5 g/dL; 20 g/dL; 20.5 g/dL; 21 g/dL; 21.5 g/dL; 22 g/dL; 22.5 g/dL; 23 g/dL; 23.5 g/dL; 24 g/dL; 24.5 g/dL; 25 g/dL; 25.5 g/dL; 26 g/dL; 26.5 g/dL; 27 g/dL; 27.5 g/dL; 28 g/dL; 28.5 g/dL; 29 g/dL; 29.5 g/dL; 30 g/dL; 31.5 g/dL; 32 g/dL; 32.5 g/dL; 33 g/dL; 33.5 g/dL; 34 g/dL; 3.5 g/dL; 35 g/dL; and more than 35 g/dL. In yet other embodiments, the absolute value of step (0 indicates a hemoglobin or glycated hemoglobin concentration of at least about 5 g/dL+/−0.1 g/dL.

The amount of hemoglobin can be measured using a light reflective characteristic. A hemoglobin measuring instrument preferably measures the amount of hemoglobin using a light emitting device such as a light emitting diode and a light receiving device such as a photodiode. For instance, the measurement of the hemoglobin value (e.g. HbA1c value) can be performed by using a spectrophotometer that measures the absorbance with a wavelength corresponding to hemoglobin. This measurement can be done at different absorbances (referred in some instances herein as $hemo_x$ and/or $hemo_y$). In some embodiments, the wavelength x is within the range of at least one set of wavelengths selected from the group consisting of: (a) 380 nm to 455 nm; (b) 455 nm to 580 nm; and (c) 580 nm to 680 nm. An example of the wavelength corresponding to HbA1c is a wavelength in a range of 415 to 430 nm. In other embodiments, the wavelength y is within the range of 700 nm to 2500 nm. In yet other embodiments, the wavelengths x and y correspond respectively to 531 nm and 725 nm.

The measurement of glycated hemoglobin requires determining a background or a baseline value. In some embodiments, this value is computed based upon the absorbance value of the buffer that is mixed with the blood sample. The measurement of the buffer's absorbance in the absence of blood is done at similar wavelengths as the ones used for hemoglobin (referred in some instances herein as $buffer_x$ and/or $buffer_s$).

In some embodiments, the blood sample is in a vessel, such as but not limited to, a capillary tube, a capillary plate or a capillary membrane, collectively referred to herein as a "capillary".

The blood sample may be a human blood sample. The blood sample may also be from other primates, other vertebrates and other mammals including, but not limited to, commercially relevant mammals such as cattle, pigs, horses, sheep, cats, and dogs.

In some embodiments of the various disclosed methods, the step of mixing to generate the hemolysate mixture comprises sonicating the blood sample and/or treating the blood sample with a lysis buffer. There is no particular limitation required for generating a hemolysate and treating the blood sample for the described methods. Various methods known in the art could be used for treating a blood sample. In some instances, the blood sample is treated under mildly acidic conditions with a pH between 3 to 6.9. Examples of buffers used under these conditions include aliphatic carboxylate buffers or borate buffers. Examples of aliphatic carboxylate buffers include monocarboxylate and dicarboxylate buffers, and more specifically, succinate, malonate, fumarate, maleate, glutarate or acetate buffers. In some embodiments, the buffer comprises lithium thiocyanate, digitonin and/or potassium ferricyanide. The buffer used in the blood assay for the described methods may include, for example, about 8.1% w/v lithium thiocyanate and about 0.01% digitonin in 200 mM glycine buffer. Variations in the concentrations and/or buffer components can be implemented by a skilled artisan such as the use of alternates to glycine. These alternates include, but are not limited to, Bis-Tris Propane, Trizma, Bicine, HEPBS, TAPS, AMPD, TABS, AMPSO, CHES, CAPSO, and AMP. The buffer may also comprise an anticoagulant selected from the group consisting of EDTA, heparin, citrate and fluoride/oxalate.

In accordance with some embodiments of the methods described herein, the hemolysate may be at least partially suspended or fully suspended.

ILLUSTRATIVE EMBODIMENTS

Provided here are illustrative embodiments of the disclosed technology. These embodiments are illustrative only and do not limit the scope of the present disclosure or of the claims attached hereto.

Embodiment 1. A method for detection of suspension of a blood sample, the method comprising:
(a) generating a hemolysate mixture by mixing a blood sample from a subject with a buffer;
(b) measuring the absorbance value of the buffer at a wavelength x ($buffer_x$) and the absorbance value of the buffer at a wavelength y ($buffer_y$);
(c) measuring the absorbance value of the hemolysate mixture at a timepoint n at a wavelength x ($hemo_{xn}$) and at a wavelength y ($hemo_{yn}$);
(d) determining the differential ($dhemo_{xn}$) between $hemo_{xn}$ and $buffer_x$;
(e) determining the differential ($dhemo_{yn}$) between $hemo_yn$ and $buffer_y$;
(f) determining the absolute value ($V_n$) of the differential between $dhemo_{xn}$ and $dhemo_{yn}$;
(g) repeating steps (c) to (e) for one additional consecutive timepoint n+1, wherein the timepoint n of step (c) becomes equal to n+1, to generate $dhemo_{xn+1}$ and $dhemo_{yn+1}$.

(h) determining the differential between $dhemo_{yn}$ and $dhemo_{yn+1}$, wherein yn and yn+1 relate to two consecutive measurements;
(i) determining the absolute value ($V_N$) of the differential between $dhemo_{yn}$ and $dhemo_{yn+1}$;
(j) determining the absolute value ($V_{n+1}$) of the differential between $dhemo_{xn+1}$ and $dhemo_{yn+1}$
(k) assessing the absolute values $V_n$, ($V_{n+1}$)-($V_n$), and $V_N$, wherein,
  i. if step (k) is performed at less than a time t from the start of the mixing in step (a) and
    a. the absolute value $V_n$ is indicative of a hemoglobin concentration of at least about 5 g/dL, the absolute value ($V_{n+1}$)-($V_n$), is about zero, and the absolute value $V_N$ is about zero, the blood sample is sufficiently mixed with the buffer for further analysis; or
    b. the absolute value of $V_n$ is not indicative of a hemoglobin concentration of at least about 5 g/dL, the absolute value of ($V_n$+1)-($V_n$), is not about zero, or the absolute value of $V_N$ is not about zero, the hemolysate is mixed further and steps (g) to (j) are repeated;
  ii. if step (k) is performed at time t from the start of the mixing and
    a. the absolute value $V_n$ is indicative of a hemoglobin concentration of at least about 5 g/dL, the blood sample is sufficiently mixed with the buffer for further analysis; or
    b. the absolute value $V_n$ is not indicative of a hemoglobin concentration of at least about 5 g/dL, the blood sample is not sufficiently mixed with the buffer for further analysis.

Embodiment 2. A method for improving the processing time of a point of care blood analysis, the method comprising:
(a) generating a hemolysate mixture by mixing a blood sample from a subject with a buffer;
(b) measuring the absorbance value of the buffer at a wavelength x ($buffer_x$) and the absorbance value of the buffer at a wavelength y ($buffer_y$);
(c) measuring the absorbance value of the hemolysate mixture at a timepoint n at a wavelength x ($hemo_{xn}$) and at a wavelength y ($hemo_{yn}$);
(d) determining the differential ($dhemo_{xn}$) between $hemo_{xn}$ and $buffer_x$;
(e) determining the differential ($dhemo_{yn}$) between $hemo_y n$ and $buffer_y$;
(f) determining the absolute value ($V_n$) of the differential between $dhemo_{xn}$ and $dhemo_{yn}$;
(g) repeating steps (c) to (e) for one additional consecutive timepoint n+1, wherein the timepoint n of step (c) becomes equal to n+1, to generate $dhemo_{xn+1}$ and $dhemo_{yn+1}$.
(h) determining the differential between $dhemo_{yn}$ and $dhemo_{yn+1}$, wherein yn and yn+1 relate to two consecutive measurements;
(i) determining the absolute value ($V_N$) of the differential between $dhemo_{yn}$ and $dhemo_{yn+1}$;
(j) determining the absolute value ($V_{n+1}$) of the differential between $dhemo_{xn+1}$ and $dhemo_{yn+1}$
(k) assessing the absolute values $V_n$, ($V_{n+1}$)-($V_n$), and $V_N$, wherein,
  i. if step (k) is performed at less than a time t from the start of the mixing in step (a) and
    a. the absolute value $V_n$ is indicative of a hemoglobin concentration of at least about 5 g/dL, the absolute value ($V_{n+1}$)-($V_n$), is about zero, and the absolute value $V_N$ is about zero, the blood sample is sufficiently mixed with the buffer for further analysis; or
    b. the absolute value of $V_n$ is not indicative of a hemoglobin concentration of at least about 5 g/dL, the absolute value of ($V_{n+1}$)-($V_n$), is not about zero, or the absolute value of $V_N$ is not about zero, the hemolysate is mixed further and steps (g) to (j) are repeated;
  ii. if step (k) is performed at time t from the start of the mixing and
    a. the absolute value $V_n$ is indicative of a hemoglobin concentration of at least about 5 g/dL, the blood sample is sufficiently mixed with the buffer for further analysis; or
    b. the absolute value $V_n$ is not indicative of a hemoglobin concentration of at least about 5 g/dL, the blood sample is not sufficiently mixed with the buffer for further analysis;
(l) analyzing the sufficiently mixed blood sample to detect the hemoglobin concentration; and,
(m) providing in less than 5 min an output result comprising the hemoglobin concentration thereby improving the point of care blood analysis as compared to a standard point of care blood analysis.

Embodiment 3. A method for detection of a glycated hemoglobin in a blood sample, the method comprising:
(a) generating a hemolysate mixture by mixing a blood sample from a subject with a buffer;
(b) measuring the absorbance value of the buffer at a wavelength x ($buffer_x$) and the absorbance value of the buffer at a wavelength y ($buffer_y$);
(c) measuring the absorbance value of the hemolysate mixture at a timepoint n at a wavelength x ($hemo_{xn}$) and at a wavelength y ($hemo_{yn}$);
(d) determining the differential ($dhemo_{xn}$) between $hemo_{xn}$ and $buffer_x$;
(e) determining the differential ($dhemo_{yn}$) between $hemo_y n$ and $buffer_y$;
(f) determining the absolute value ($V_n$) of the differential between $dhemo_{xn}$ and $dhemo_{yn}$;
(g) repeating steps (c) to (e) for one additional consecutive timepoint n+1, wherein the timepoint n of step (c) becomes equal to n+1, to generate $dhemo_{xn+1}$ and $dhemo_{yn+1}$;
(h) determining the differential between $dhemo_{yn}$ and $dhemo_{yn+1}$, wherein yn and yn+1 relate to two consecutive measurements;
(i) determining the absolute value ($V_N$) of the differential between $dhemo_{yn}$ and $dhemo_{yn+1}$;
(j) determining the absolute value ($V_{n+1}$) of the differential between $dhemo_{xn+1}$ and $dhemo_{yn+1}$
(k) assessing the absolute values $V_n$, ($V_{n+1}$)-($V_n$), and $V_N$, wherein,
  i. if step (k) is performed at less than a time t from the start of the mixing in step (a) and
    a. the absolute value $V_n$ is indicative of a hemoglobin concentration of at least about 5 g/dL, the absolute value ($V_n$+1)-($V_n$) is about zero, and the absolute value $V_N$ is about zero, the blood sample is sufficiently mixed with the buffer for further analysis; or
    b. the absolute value of $V_n$ is not indicative of a hemoglobin concentration of at least about 5 g/dL, the absolute value of ($V_{n+1}$)-($V_n$) is not about zero, or the absolute value of $V_N$ is not about zero, the hemolysate is mixed further and steps (g) to (j) are repeated;

ii. if step (k) is performed at time t from the start of the mixing and a. the absolute value $V_n$ is indicative of a hemoglobin concentration of at least about 5 g/dL, the blood sample is sufficiently mixed with the buffer for further analysis; or b. the absolute value $V_n$ is not indicative of a hemoglobin concentration of at least about 5 g/dL, the blood sample is not sufficiently mixed with the buffer for further analysis.

Embodiment 4. A method for performing a blood sugar assay, the method comprising:

(a) generating a hemolysate mixture by mixing a blood sample from a subject with a buffer;

(b) measuring the absorbance value of the buffer at a wavelength x (buffer$_x$) and the absorbance value of the buffer at a wavelength y (buffer$_y$);

(c) measuring the absorbance value of the hemolysate mixture at a timepoint n at a wavelength x (hemo$_{xn}$) and at a wavelength y (hemo$_{yn}$);

(d) determining the differential (dhemo$_{xn}$) between hemo$_{xn}$ and buffer$_x$;

(e) determining the differential (dhemo$_{yn}$) between hemo$_y$n and buffer$_y$;

(f) determining the absolute value ($V_n$) of the differential between dhemo$_{xn}$ and dhemo$_{yn}$;

(g) repeating steps (c) to (e) for one additional consecutive timepoint n+1, wherein the timepoint n of step (c) becomes equal to n+1, to generate dhemo$_{xn+1}$ and dhemo$_{yn+1}$.

(h) determining the differential between dhemo$_{yn}$ and dhemo$_{yn+1}$, wherein yn and yn+1 relate to two consecutive measurements;

(i) determining the absolute value ($V_N$) of the differential between dhemo$_{yn}$ and dhemo$_{yn+1}$;

(j) determining the absolute value ($V_{n+1}$) of the differential between dhemo$_{xn+1}$ and dhemo$_{yn+1}$;

(k) assessing the absolute values $V_n$, ($V_{n+1}$)-($V_n$), and $V_N$, wherein, i. if step (k) is performed at less than a time t from the start of the mixing in step (a) and a. the absolute value $V_n$ is indicative of a glycated hemoglobin concentration of at least about 5 g/dL, the absolute value ($V_{n+1}$)-($V_n$) is about zero, and the absolute value $V_N$ is about zero, the blood sample is sufficiently mixed with the buffer for further analysis; or b. the absolute value of $V_n$ is not indicative of a glycated hemoglobin concentration of at least about 5 g/dL, the absolute value of ($V_{n+1}$)-($V_n$) is not about zero, or the absolute value of $V_N$ is not about zero, the hemolysate is mixed further and steps (g) to (j) are repeated;

ii. if step (k) is performed at time t from the start of the mixing and a. the absolute value $V_n$ is indicative of a glycated hemoglobin concentration of at least about 5 g/dL, the blood sample is sufficiently mixed with the buffer for further analysis; or b. the absolute value $V_n$ is not indicative of a glycated hemoglobin concentration of at least about 5 g/dL, the blood sample is not sufficiently mixed with the buffer for further analysis;

(l) analyzing the sufficiently mixed blood sample to detect the glycated hemoglobin concentration;

(m) assessing the level of sugar in the blood sample based upon the glycated hemoglobin concentration so detected; and, (n) providing an output result for the blood sugar assay, the output comprising the glycated hemoglobin concentration and the level of sugar in the blood sample.

Embodiment 5. A method for diagnosing diabetes in a subject, the method comprising:

(a) generating a hemolysate mixture by mixing a blood sample from a subject with a buffer;

(b) measuring the absorbance value of the buffer at a wavelength x (buffer$_x$) and the absorbance value of the buffer at a wavelength y (buffer$_y$);

(c) measuring the absorbance value of the hemolysate mixture at a timepoint n at a wavelength x (hemo$_{xn}$) and at a wavelength y (hemo$_{yn}$);

(d) determining the differential (dhemo$_{xn}$) between hemo$_{xn}$ and buffer$_x$;

(e) determining the differential (dhemo$_{yn}$) between hemo$_y$n and buffer$_y$;

(f) determining the absolute value ($V_n$) of the differential between dhemo$_{xn}$ and dhemo$_{yn}$;

(g) repeating steps (c) to (e) for one additional consecutive timepoint n+1, wherein the timepoint n of step (c) becomes equal to n+1, to generate dhemo$_{xn+1}$ and dhemo$_{yn+1}$.

(h) determining the differential between dhemo$_{yn}$ and dhemo$_{yn+1}$, wherein yn and yn+1 relate to two consecutive measurements;

(i) determining the absolute value ($V_N$) of the differential between dhemo$_{yn}$ and dhemo$_{yn+1}$;

(j) determining the absolute value ($V_{n+1}$) of the differential between dhemo$_{xn+1}$ and dhemo$_{yn+1}$ (k) assessing the absolute values $V_n$, ($V_{n+1}$)-($V_n$), and $V_N$, wherein, i. if step (k) is performed at less than a time t from the start of the mixing in step (a) and a. the absolute value $V_n$ is indicative of a glycated hemoglobin concentration of at least about 5 g/dL, the absolute value ($V_{n+1}$)-($V_n$) is about zero, and the absolute value $V_N$ is about zero, the blood sample is sufficiently mixed with the buffer for further analysis; or b. the absolute value of $V_n$ is not indicative of a glycated hemoglobin concentration of at least about 5 g/dL, the absolute value of ($V_n+1$)-($V_n$) is not about zero, or the absolute value of $V_N$ is not about zero, the hemolysate is mixed further and steps (g) to (j) are repeated;

ii. if step (k) is performed at time t from the start of the mixing and a. the absolute value $V_n$ is indicative of a glycated hemoglobin concentration of at least about 5 g/dL, the blood sample is sufficiently mixed with the buffer for further analysis; or b. the absolute value $V_n$ is not indicative of a glycated hemoglobin concentration of at least about 5 g/dL, the blood sample is not sufficiently mixed with the buffer for further analysis;

(l) analyzing the sufficiently mixed blood sample to detect the glycated hemoglobin concentration;

(m) determining glucose concentration in the blood sample from the subject based upon the glycated hemoglobin concentration so detected;

(n) providing an output result comprising the glycated hemoglobin concentration and the glucose concentration in the blood sample from the subject;

(o) diagnosing the subject with diabetes when the glucose concentration in the blood sample is above a reference concentration; and, (p) when diagnosed with diabetes, recommending a treatment of the subject, wherein the treatment comprises diet, exercise and/or medication.

Embodiment 6. The method of embodiment 5, wherein the steps (a) to (n) of blood sample processing of embodiment 4 are performed in less than 5 minutes.

Embodiment 7. The method of embodiment 5, wherein the steps (a) to (n) of blood sample processing of embodiment 4 are performed in about 3.5 minutes.

Embodiment 8. The method of any one of embodiments 1-5, wherein the time t is about 60 seconds, about 70 seconds, about 80 seconds, about 90 seconds, about 100 seconds, about 110 seconds or about 120 seconds.

Embodiment 9. The method of any one of embodiments 1-5, wherein the hemolysate mixture comprises sonicating the blood sample and/or treating the blood sample with a lysis buffer.

Embodiment 10. The method of any one of embodiments 1-5, wherein the buffer comprises lithium thiocyanate, digitonin and/or potassium ferricyanide.

Embodiment 11. The method of any one of embodiments 1-5, wherein the buffer comprises an anticoagulant selected from the group consisting of EDTA, heparin, citrate and fluoride/oxalate.

Embodiment 12. The method of any one of embodiments 1-5, wherein the blood sample is in a capillary tube, a capillary plate or a capillary membrane.

Embodiment 13. The method of any one of embodiments 1-5, wherein the wavelength x is within the range of at least one set of wavelengths selected from the group consisting of:
 a. 380 nm to 455 nm;
 b. 455 nm to 580 nm; and
 c. 580 nm to 680 nm.

Embodiment 14. The method of any one of embodiments 1-5, wherein the wavelength y is within the range of 700 nm to 2500 nm.

Embodiment 15. The method of any one of embodiments 1-5, wherein the wavelengths x and y correspond respectively to 531 nm and 725 nm.

Embodiment 16. The method of any one of embodiments 1-5, wherein step (c) is performed at least 2 seconds after step (b).

Embodiment 17. The method of any one of embodiments 1-5, wherein, if the blood sample is indicated to be not sufficiently mixed in step (k)(ii)(b), the blood sample is replaced by another blood sample.

Embodiment 18. The method of any one of embodiments 1-5, wherein step (g) is repeated 30 times or less.

Embodiment 19. The method of any one of embodiments 1-5, wherein the hemolysate is at least partially suspended.

Embodiment 20. The method of any one of embodiments 1-5, wherein the blood sample is a human blood sample.

Embodiment 21. The method of any one of embodiments 1-5, wherein the absolute value of (i) is about the absolute value of (0+/−0.002) or (−0.0002619+/−0.001349).

Embodiment 22. The method of any one of embodiments 1-5, wherein the absolute value of $(V_{n+1})-(V_n)$ is about the absolute value of (0+/−0.002) or (−0.0006418+/−0.001758).

Embodiment 23. The method of any one of embodiments 1-5, wherein the hemoglobin concentration or glycated hemoglobin concentration is at least about 5 g/dL.

Embodiment 24. The method of any one of embodiments 1-5, wherein the hemoglobin concentration or glycated hemoglobin concentration is about at least about 7 g/dL.

Embodiment 25. The method of any one of embodiments 1 and 2, wherein the hemoglobin comprises hemoglobin A, hemoglobin A1c, hemoglobin C, hemoglobin E, hemoglobin D, hemoglobin F, and hemoglobin S.

Embodiment 26. The method of any one of embodiments 1 and 2, wherein the hemoglobin is a glycated hemoglobin.

Embodiment 27. The method of embodiment 26, wherein the glycated hemoglobin is hemoglobin A1c (HbA1c).

Embodiment 28. The method of any one of embodiments 3-5, wherein the glycated hemoglobin is hemoglobin A1c (HbA1c).

EXAMPLES

The following examples are provided to further describe some of the embodiments disclosed herein. The examples are intended to illustrate, not to limit, the disclosed embodiments.

Blood is drawn into a capillary tube from a fingerstick or tube of veinous blood. Excess blood is wiped from the capillary tube. The capillary tube is inserted into a sample cartridge. The cartridge is placed in a Siemens DCA Vantage® analyzer. Buffer (8.1% w/v lithium thiocyanate and 0.01% digitonin in 200 mM glycine) absorbance is read at 531 nm and at 725 nm. The differential ($\Delta_{buffer}$) between the buffer pickup reads is computed. The blood sample is mixed with the buffer to generate a hemolysate. The absorbance value of the hemolysate at 531 nm ($hemo_{531}$) and at 725 nm ($hemo_{725}$) at a first timepoint is computed. The differential between $hemo_{531}$ and $hemo_{725}$ ($\Delta_{hemo}$) is computed. The absolute value of the differential between $\Delta_{hemo}$ and $\Delta_{buffer}$ [$|\Delta_{hemo}-\Delta_{buffer}|$] is computed as Criteria 1. The absorbance at timepoint n of the hemolysate at wavelength 531 ($hemo_{531n}$) and at wavelength 725 ($hemo_{725n}$) is measured. The absolute value of the differential between the blood pickup reads of the two timepoints at 725 nm [$|hemo_{725}\ hemo_{725n}|$] is computed as Criteria 2. The absolute value of the differential between the 531 nm to 725 nm change in two blood pickup reads taken at different timepoints from the start of mixing is computed as Criteria 3.

If the criteria are evaluated at less than 60 seconds from the start of mixing of the blood sample with the buffer, and: $|\Delta_{hemo}-\Delta_{buffer}|$ is indicative of a hemoglobin concentration of at least about 5 g/dL+/−0.1 g/dL (Criteria 1); [$|hemo_{725}\ hemo_{725n}|$ is about zero (Criteria 2); and the absolute value of the differential between the 531 nm to 725 nm change in the two blood pickup reads is about zero (Criteria 3), the blood sample is sufficiently mixed with the buffer for further analysis.

If the criteria are evaluated at less than 60 seconds from the start of mixing of the blood sample with the buffer, and: $|\Delta_{hemo}-\Delta_{buffer}|$ is not indicative of a hemoglobin concentration of at least about 5 g/dL+/−0.1 g/dL (Criteria 1); [$|hemo_{725}\ hemo_{725n}|$ is not about zero (Criteria 2); or the absolute value of the differential between the 531 nm to 725 nm change in the two blood pickup reads is not about zero (Criteria 3), the hemolysate is mixed further and the following steps are repeated. The absorbance value of the hemolysate at 531 nm ($hemo_{531}$) and at 725 nm ($hemo_{725}$) at a first timepoint is computed as Criteria 1. The differential between $hemo_{531}$ and $hemo_{725}$ ($\Delta_{hemo}$) is computed. The absolute value of the differential between $\Delta_{hemo}$ and $\Delta_{buffer}$ [$|\Delta_{hemo}-\Delta_{buffer}|$] is computed. The absorbance at timepoint n of the hemolysate at wavelength 531 (hemo$_{531n}$) and at wavelength 725 (hemo$_{725n}$) is measured. The absolute value of the differential between the blood pickup reads of the two timepoints at 725 nm [|hemo$_{725}$ hemo$_{725n}$|] is computed as Criteria 2. The absolute value of the differential between the 531 nm to 725 nm change in two blood pickup reads taken at different timepoints from the start of mixing is computed as Criteria 3, wherein in this repeated step, the first blood pickup read is the first blood pickup read of the overall assay.

If the criteria are evaluated at 60 seconds or more from the start of mixing of the blood sample with the buffer, and: $|\Delta_{hemo}-\Delta_{buffer}|$ is indicative of a hemoglobin concentration of at least about 5 g/dL+/−0.1 g/dL (Criteria 1), the blood sample is sufficiently mixed with the buffer for further analysis.

If the criteria are evaluated at 60 seconds or more from the start of mixing of the blood sample with the buffer, and: $|\Delta_{hemo}-\Delta_{buffer}|$ is not indicative of a hemoglobin concentration of at least about 5 g/dL+/−0.1 g/dL (Criteria 1), the blood sample is not sufficiently mixed with the buffer for further analysis.

Figure 1:
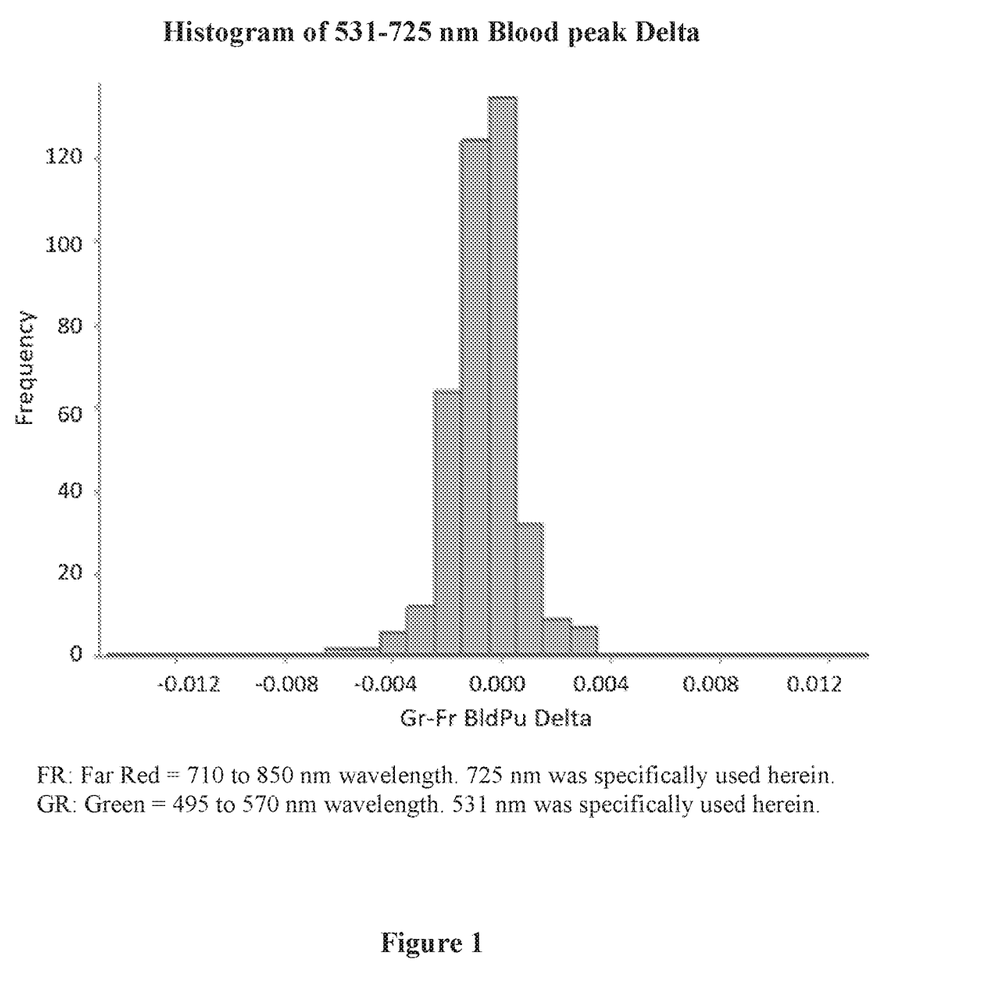
FIG. 1 is a histogram depicting the distribution of blood absorbance between readings. An experimental dataset was collected with whole blood (14 g/dL, about 4.7% HbA1c). From this dataset the normal distribution of absorbance (531-725 nm) between Blood Pickup readings was obtained. The mean and standard deviation of the expected values were used for true/false criteria 3. FR: Far Red=710 to 850 nm wavelength. 725 nm was specifically used herein; GR: Green=495 to 570 nm wavelength. 531 nm was specifically used herein.

The distribution of blood absorbance between readings is shown in FIG. 1. An experimental dataset was collected with whole blood (14 g/dL, about 4.7% HbA1c). From this dataset the normal distribution of absorbance (531-725 nm) between Blood Pickup readings was obtained. The mean and standard deviation of the expected values were used for true/false criteria 3.

Figure 2:
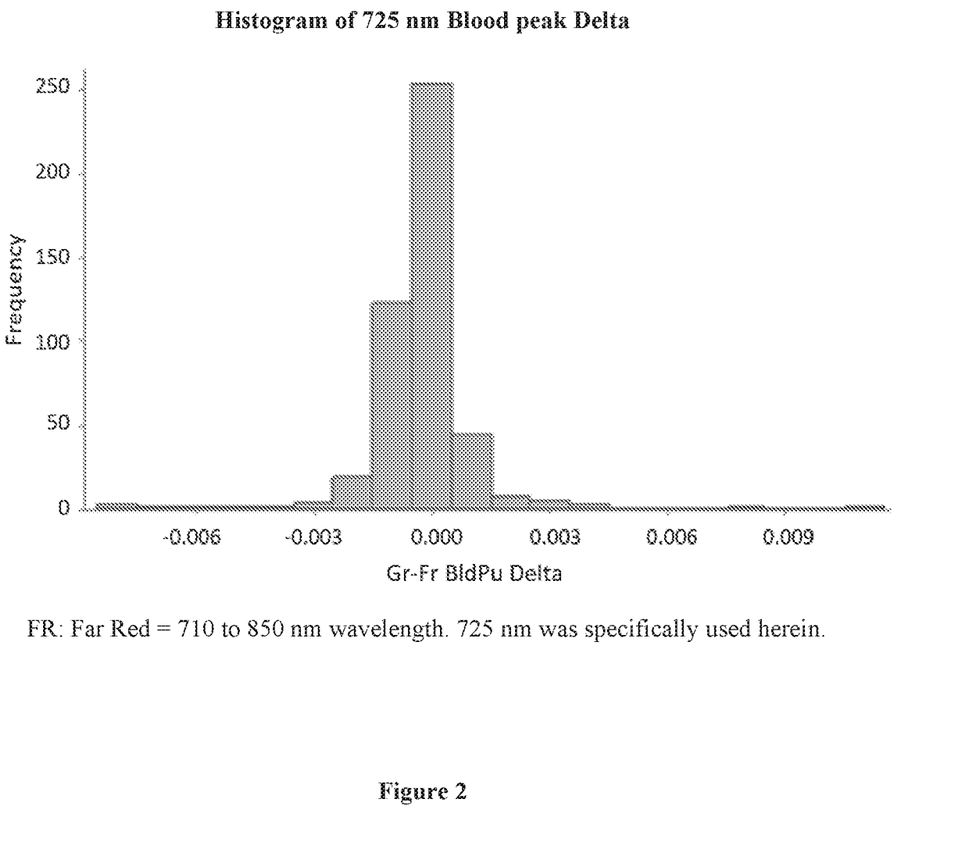
FIG. 2 is a histogram based on the data of FIG. 1: The same dataset from FIG. 1 was used for determining the mean and standard deviation for true/false criteria 2.

The histogram depicted in FIG. 2 is based on the data of FIG. 1: The same dataset from FIG. 1 was used for determining the mean and standard deviation for true/false criteria 2.

The dataset from FIG. 1 and FIG. 2 was used for determining the impact of using hemoglobin values collected when the 3 criteria were met (or criteria 1 after final Blood Pickup reading). No hemoglobin correction was used and only the first absorbance values were used for determining hemoglobin concentration. This explains why the percentage coefficient of variation (% CV) is centered on 2.5 rather than 2.0.

Figure 3:
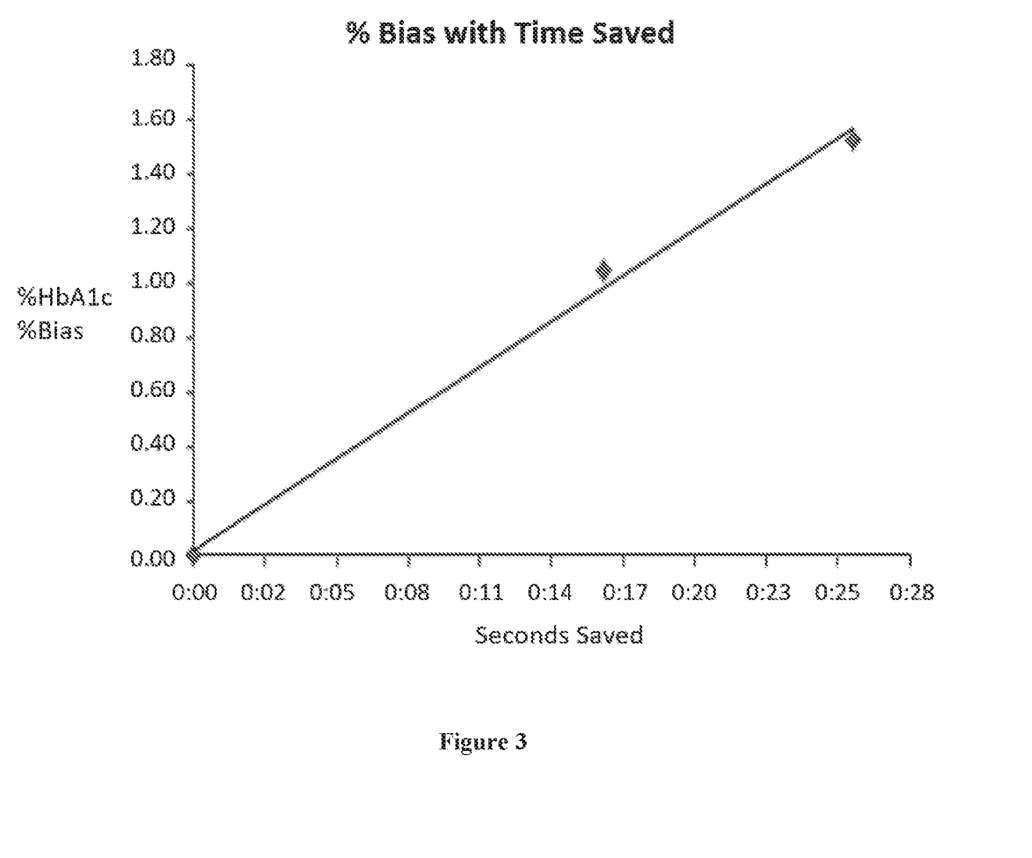
FIG. 3 is a graph illustrating the percentage of bias with time saved.

The percentage of bias with time saved is shown in FIG. 3. When one standard deviation was used for criteria 2-3 there was an average time savings of 26 seconds. There was minimal to no impact on the % CV observed and the percentage bias (% Bias) appeared to be a linear correlation to time mixing (FIG. 3).

Figure 4B:
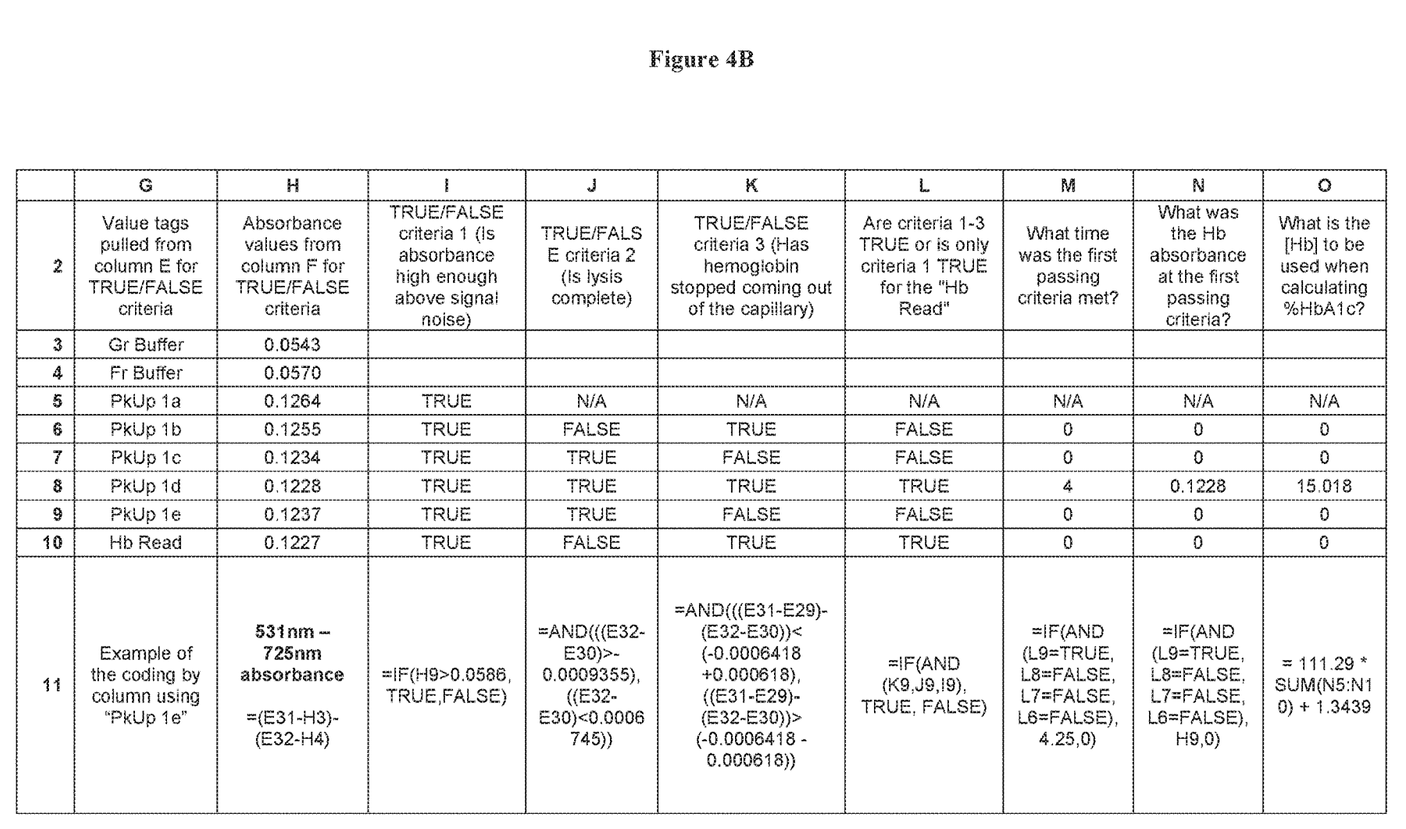
FIG. 4B. is a table illustrating the various data processing steps for rapid analysis of a blood sample.

The tables from FIGS. 4A-4B provide an experimental demonstration of how a dataset (FIG. 4A) is processed using the presently disclosed methods. The various steps of data processing, including the main "True/False" tested criteria, are listed in FIG. 4B.

Figure 5:
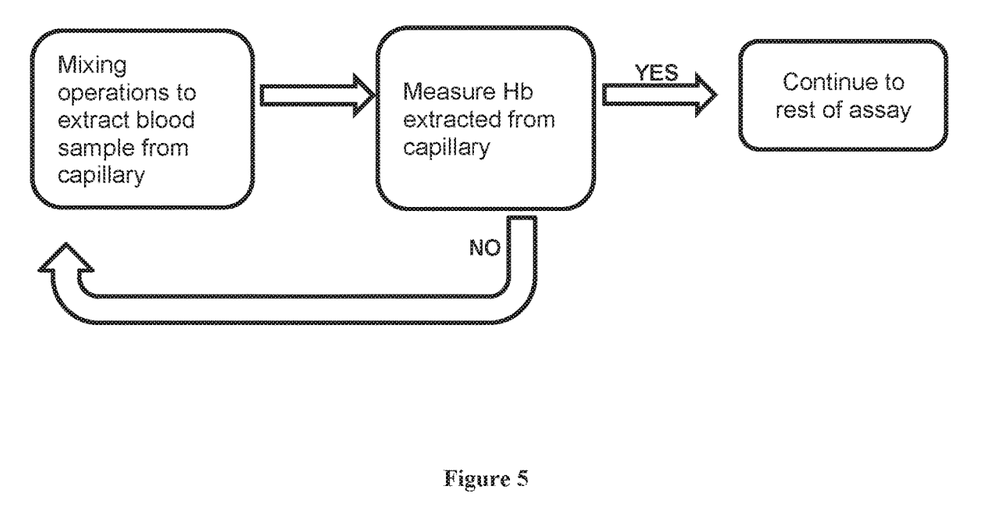
FIG. 5 is a diagram depicting the main steps of the methods disclosed herein. Mixing is performed to extract blood sample from capillary. Hemoglobin (Hb) is measured to determine if enough blood sample has been extracted. If yes, the assay can proceed without additional mixing. If no, the mixing operation and the absorbance measuring steps are repeated.

In sum, the presently disclosed methods are adaptive methods as they rely on measuring hemoglobin and using this measure as a reference signal to determine if enough of the blood sample has come out of the capillary of the instrument. These adaptive methods allow the assay to be completed faster for most samples. For the samples that may have resulted in an error, the disclosed methods provide the ability to mix longer while resulting in a longer assay time which prevents an error and a resampling. The overall protocol for these methods is illustrated in the diagram of FIG. 5.

The disclosures of each and every patent, patent application, and publication cited herein are hereby incorporated herein by reference in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

The invention claimed is:

1. An automated method for performing a blood sugar assay by a point of care immunoassay analyzer, the method comprising the following steps performed in the point of care immunoassay analyzer:
   (a) generating a hemolysate mixture by mixing a blood sample from a subject with a buffer;
   (b) measuring an absorbance value of the buffer at a wavelength x (buffer$_x$) and an absorbance value of the buffer at a wavelength y (buffer$_y$);
   (c) measuring an absorbance value of the hemolysate mixture at a timepoint n at a wavelength x (hemo$_{xn}$) and at a wavelength y (hemo$_{yn}$);
   (d) determining a differential (dhemo$_{xn}$) between hemoxn and buffer$_x$;
   (e) determining a differential (dhemo$_{yn}$) between hemoyn, and buffer$_y$;
   (f) determining an absolute value ($V_n$) of the differential between dhemoxn and dhemo$_{yn}$;
   (g) repeating steps (c) to (e) for one additional consecutive timepoint n+1, wherein the timepoint n of step (c) becomes equal to n+1, to generate dhemo$_{xn+1}$ and dhemo$_{yn+1}$;
   (h) determining a differential between dhemoyn, and dhemo$_{yn+1}$, wherein yn and yn+1 relate to two consecutive measurements;
   (i) determining an absolute value ($V_N$) of the differential between dhemo$_{yn}$, and dhemo$_{yn+1}$;
   (j) determining an absolute value ($V_{n+1}$) of the differential between dhemo$_{xn+1}$ and dhemo$_{yn+1}$;
   (k) assessing the absolute value $V_n$, an absolute value ($V_{n+1}$)−($V_n$), and the absolute value $V_N$, wherein,
      i. if step (k) is performed at less than a time t from a start of the mixing in step (a) and
         a. the absolute value $V_n$, is indicative of a glycated hemoglobin concentration of at least about 5 g/dL to about 21 g/dL, the absolute value (Vn+1)−($V_n$) is about zero, and the absolute value $V_N$ is about zero, the blood sample is sufficiently mixed with the buffer for further analysis and the method proceeds to step (1); or
         b. the absolute value of $V_n$, is not indicative of a glycated hemoglobin concentration of at least about 5 g/dL to about 21g/dL, the absolute value of (Vn+1)−($V_n$) is not about zero, or the absolute value of $V_N$ is not about zero, the hemolysate is mixed further and steps (g) to (j) are repeated;
      ii. if step (k) is performed at time t from the start of the mixing in step (a) and
         a. the absolute value $V_n$, is indicative of a glycated hemoglobin concentration of at least about 5 g/dL to about 21 g/dL, the blood sample is sufficiently mixed with the buffer for further analysis and the method proceeds to step (1); or
         b. the absolute value Vn is not indicative of a glycated hemoglobin concentration of at least about 5 g/dL to about 21 g/dL, the blood sample is not sufficiently mixed with the buffer for further analysis and steps (g) to (j) are repeated;

(l) analyzing the sufficiently mixed blood sample to detect a glycated hemoglobin concentration;

(m) assessing a level of sugar in the blood sample based upon the glycated hemoglobin concentration so detected; and, (n) providing an output result for the blood sugar assay, the output result comprising the glycated hemoglobin concentration and the level of sugar in the blood sample; and wherein measuring the absorbance values in steps (b) and (c) and analyzing the sufficiently mixed blood sample to detect the glycated hemoglobin concentration of step (l) are accomplished with a spectrophotometer in the point of care immunoassay analyzer.

2. The automated method of claim 1, wherein the mixing of the blood sample comprises sonicating the blood sample.

3. The automated method of claim 1, wherein the buffer comprises lithium thiocyanate, digitonin, potassium ferricyanide and/or an anticoagulant selected from the group consisting of EDTA, heparin, citrate and fluoride/oxalate.

4. The automated method of claim 1, wherein the blood sample is in a vessel during the performance of at least one step, the vessel comprising a capillary tube, a capillary plate or a capillary membrane.

5. The automated method of claim 1, wherein the wavelength x is within the range of at least one set of wavelengths selected from the group consisting of:
  a. 380 nm to 455 nm;
  b. 455 nm to 580 nm; and
  c. 580 nm to 680 nm; and,
  wherein the wavelength y is within a range of 700 nm to 2500 nm.

6. The automated method of claim 1, wherein the wavelengths x and y correspond respectively to 531 nm and 725 nm.

7. The automated method of claim 1, wherein step (c) is performed at least 2 seconds after step (d).

8. The automated method of claim 1, wherein, if the blood sample is indicated to be not sufficiently mixed in step (k)(ii)(b), the blood sample is replaced by another blood sample.

9. The automated method of claim 1, wherein the time t is about 60 seconds, about 70 seconds, about 80 seconds, about 90 seconds, about 100 seconds, about 110 seconds or about 120 seconds.

10. The automated method of claim 1, wherein the hemolysate is at least partially suspended.

11. The automated method of claim 1, wherein the blood sample is a human blood sample.

12. The automated method of claim 1, wherein the absolute value of (i) is about the absolute value of (0+/−0.002) or (−0.0002619+/−0.001349).

13. The automated method of claim 1, wherein the absolute value of $(V_{n+1})-(V_n)$ is about the absolute value of (0+/−0.002) or (−0.0006418+/−0.001758).

14. The automated method of claim 1, wherein the absoluate value $V_n$ assessed at step (k) is indicative of a glycated hemoglobin concentration of at least about one selected from the group consisting of: 5 g/dL and 7 g/dL.

15. The automated method of claim 1, wherein the glycated hemoglobin is hemoglobin A1c (HbA1c).

16. An automated method for performing a blood sugar assay by a point of care immunoassay analyzer, the method comprising the following steps (a)-(f) performed in the point of care immunoassay analyzer:

(a) generating a hemolysate mixture by mixing a blood sample from a subject with a buffer;

(b) taking multiple absorbance measurements of the mixed hemolysate mixture at instants of time with a spectrophotometer;

(c) determining whether the hemolysate mixture is sufficiently mixed at different ones of the instants of times using the multiple absorbance measurements of the mixed hemolysate mixture, wherein the hemolysate mixture is determined to be sufficiently mixed when $|\Delta_{hemo}-\Delta_{buffer}|$ is indicative of a hemoglobin concentration of at least about 5 g/dL+/−0.1 g/dL to about 21 g/dL, wherein $\Delta_{buffer}$ is a differential of absorbance values of the buffer measured at a wavelength x and a wavelength y and $\Delta_{hemo}$ is a differential of absorbance values of the hemolysate mixture measured at the wavelength x and the wavelength y;

(d) responsive to the hemolysate mixture being insufficiently mixed, continue mixing the hemolysate mixture and repeat steps (b)-(c); and (e) responsive to the hemolysate mixture being sufficiently mixed, detecting a glycated hemoglobin concentration within the sufficiently mixed hemolysate mixture with the spectrophotometer; and (f) providing an output result comprising the glycated hemoglobin concentration.

17. The method of claim 16, wherein the output result is provided in less than 5 minutes thereby improving point of care blood analysis as compared to a standard point of care blood analysis.

* * * * *

UNITED STATES PATENT AND TRADEMARK OFFICE
CERTIFICATE OF CORRECTION

| | | |
|---|---|---|
| PATENT NO. | : 12,474,356 B2 | Page 1 of 1 |
| APPLICATION NO. | : 17/310233 | |
| DATED | : November 18, 2025 | |
| INVENTOR(S) | : Aaron Kauffmann and Chris Zimmerle | |

It is certified that error appears in the above-identified patent and that said Letters Patent is hereby corrected as shown below:

In the Claims

Column 23, Lines 35-36, in Claim 7, delete the wording "step (d)" and insert the wording
-- step (b) --.

Column 24, Lines 1-3, in Claim 12, after the wording "wherein the absolute value", delete the wording
"of" and insert the wording -- (VN) determined in step --.

Column 24, Lines 7-8, in Claim 14, delete the wording "absoluate" and insert the wording
-- absolute --.

Signed and Sealed this
Thirteenth Day of January, 2026

John A. Squires
*Director of the United States Patent and Trademark Office*